US008504355B2

(12) United States Patent
Ylonen

(10) Patent No.: US 8,504,355 B2
(45) Date of Patent: Aug. 6, 2013

(54) JOINT DISAMBIGUATION OF SYNTACTIC AND SEMANTIC AMBIGUITY

(75) Inventor: Tatu J Ylonen, Espoo (FI)

(73) Assignee: Clausal Computing Oy, Helsinki (FI)

( * ) Notice: Subject to any disclaimer, the term of this patent is extended or adjusted under 35 U.S.C. 154(b) by 765 days.

(21) Appl. No.: 12/622,589

(22) Filed: Nov. 20, 2009

(65) Prior Publication Data

US 2011/0125487 A1 May 26, 2011

(51) Int. Cl.
*G06F 17/27* (2006.01)
(52) U.S. Cl.
USPC .................................. 704/9; 704/257; 704/1
(58) Field of Classification Search
USPC ............... 704/1–10, 251, 255, 257, 277, 270, 704/270.1; 707/758
See application file for complete search history.

(56) References Cited

U.S. PATENT DOCUMENTS

| | | | |
|---|---|---|---|
| 5,418,717 A * | 5/1995 | Su et al. ........................... | 704/9 |
| 6,950,814 B2 | 9/2005 | Bergan | |
| 7,536,374 B2 | 5/2009 | Au | |
| 7,596,568 B1 | 9/2009 | McConnell | |
| 7,895,221 B2 * | 2/2011 | Colledge et al. ............... | 707/758 |
| 7,899,666 B2 * | 3/2011 | Varone .............................. | 704/9 |
| 2001/0056445 A1 | 12/2001 | Meystel | |
| 2003/0130976 A1 | 7/2003 | Au | |
| 2008/0275694 A1 | 11/2008 | Varone | |
| 2009/0076799 A1 | 3/2009 | Crouch | |

OTHER PUBLICATIONS

E. Agirre: Improving Parsing and PP attachment Performance with Sense Information, Proceedings of ACL-08: HLT, pp. 317-325, Association for Computational Linguistics (ACL), 2008.
T. Baldwin: Prepositions in Applications: A Survey and Introduction to the Special Issue, Computational Linguistics, 35(2):119-149, 2009.
D. Carter: Control Issues in Anaphor Resolution, Journal of Semantics, 7:435-454, 1990.
S. Cohen et al: Joint Morphological and Syntactic Disambiguation, EMNLP-CoNLL'07, Association for Computational Linguistics (ACL), 2007.
R. Ge et al: Discriminative Deranking for Semantic Parsing, Proceedings of the COLING/ACL 2006 Main Conference Poster Sessions, pp. 263-270, Association for Computational Linguistics (ACL), 2006.
R. Girju: The Syntax and Semantics of Prepositions in the Task of Automatic Interpretation of Nominal Phrases and Compounds: A Cross-Linguistic Study, Computational Linguistics, 35(2):185-228, 2008.
Y. Goldberg et al: A Single Generative Model for Joing Morphological Segmentation and Syntactic Parsing, ACL-08: HLT, pp. 371-379, Association for Computational Linguistics (ACL), 2008.
F. Jorgensen et al: A Minimal Recursion Semantic Analysis of Locatives, Computational Linguistics, 35(2):229-270, 2008.

(Continued)

*Primary Examiner* — Huyen X. Vo

(57) ABSTRACT

Ambiguities in a natural language expression are interpreted by jointly disambiguating multiple alternative syntactic and semantic interpretations. More than one syntactic alternative, represented by parse contexts, are analyzed together with joint analysis of referents, word senses, relation types, and layout of a semantic representation for each syntactic alternative. Best combinations of interpretations are selected from all participating parse contexts, and are used to form parse contexts for the next step in parsing.

16 Claims, 4 Drawing Sheets

OTHER PUBLICATIONS

R. Kasper et al: Performing Integrated Syntactic and Semantic Parsing Using Classification, Proceedings of the workshop on Speech and Natural Language, pp. 54-59, Association for Computational Linguistics (ACL), 1990.

R. Navigli: Word Sense Disambiguation: A Survey, Computing Surveys, 41(2), pp. 10:1-10:69, 2009.

T. O'Hara et al: Exploiting Semantic Role Resources for Preposition Disambiguation, Computational Linguistics, 35(2):151-184, 2008.

R. Tsarfaty: Integrated Morphological and Syntactic Disambiguation for Modern Hebrew, COLING/ACL 2006 Student Research Workshop, pp. 49-54, 2006.

* cited by examiner

JOINT DISAMBIGUATION OF SYNTACTIC AND SEMANTIC AMBIGUITY

CROSS-REFERENCE TO RELATED APPLICATIONS

Not Applicable

INCORPORATION-BY-REFERENCE OF MATERIAL SUBMITTED ON ATTACHED MEDIA

Not Applicable

TECHNICAL FIELD

The present invention relates to computational linguistics, particularly to disambiguation of ambiguities in connection with parsing natural language.

BACKGROUND OF THE INVENTION

Deep semantic interpretation of natural language is notoriously difficult. Despite extensive research on meaning representation spanning several decades, there still is no universally accepted method of representing sentence meanings, much less constructing them from text. Only partial solutions exist for disambiguating natural language expressions and for reference resolution.

One of the problem areas is the interpretation of syntactic ambiguities, such as the attachment of prepositional phrases.

Improvements in deep semantic interpretation could enable breakthroughs in, e.g., machine translation, search, information extraction, spam filtering, computerized assistance applications, computer-aided education, and many other applications intelligently processing information expressed in natural language, including the natural language control of robots and various home and business appliances.

State of the art in word sense disambiguation has been recently surveyed in R. Navigli: Word Sense Disambiguation: A Survey, Computing Surveys, 41(2), pp. 10:1-10:69, February 2009.

An introduction and survey of the problem of disambiguating prepositional attachments can be found in T. Baldwin et al: Prepositions in Applications: A Survey and Introduction to the Special Issue, Computational Linguistics, 35(2):119-149, June 2009.

BRIEF SUMMARY OF THE INVENTION

The present invention provides an improved method for analyzing the attachment of prepositional phrases, as well as other syntactic ambiguity problems, in a unified framework with semantic disambiguation. It builds on earlier work on jointly disambiguating more than one ambiguous aspect of the meaning of a natural language expression as disclosed in the co-owned U.S. patent application Ser. No. 12/622,272, which is hereby incorporated herein by reference. The present invention extends that work to handle also syntactic ambiguities.

To borrow an example from Baldwin et al (2009), consider the sentence "Kim eats pizza with chopsticks". For a computer, it is not easy to decide whether Kim is eating pizza that includes chopsticks, or is using chopsticks to eat pizza.

Now, given that Kim is our dog and has eaten the pizza she found in the trash, and we are worried that the broken chopsticks she ate might puncture her bowels, how should a computerized question answering system advise us?

This example demonstrates that it is impossible to robustly solve syntactic ambiguity, such as the attachment of prepositions, without utilizing our full knowledge of the situation. To robustly interpret unrestricted sentences, it is advantageous to consider both syntactic and semantic ambiguities simultaneously.

A first aspect of the invention is a method of resolving both semantic and syntactic ambiguity, comprising:
  generating, by a computer, combinations of semantic interpretation choices for each of at least two alternative syntactic parses of a natural language expression or part thereof; and
  selecting, by the computer, one or more best combinations from those generated for all of the alternative syntactic parses.

A second aspect of the invention is an apparatus comprising:
  a multi-context disambiguator (115), comprising:
    at least one enumerator;
    at least one combinator (119) coupled to at least one of the enumerators for receiving choices from the enumerator; and
    at least one selector (308) coupled to the combinators for selecting at least one best combination from the combinations generated by any of the combinators.

A third aspect of the invention is a computer readable medium comprising a computer program product, which when executed on a computer is operable to cause the computer to resolve both semantic and syntactic ambiguity in a parsed natural language expression, the medium comprising:
  a computer readable program code means for causing a computer to generate combinations of semantic interpretation choices for each of at least two alternative syntactic parses of a natural language expression or part thereof; and
  a computer readable program code means for causing a computer to select one or more best combinations from those generated for all of the alternative syntactic parses.

This summary is provided to introduce a selection of concepts in a simplified form that are further described below in the detailed description. This summary is not intended to identify key features or essential features of the claimed subject matter, nor is it intended that this summary be used to limit the scope of the claimed subject matter. Furthermore, the claimed subject matter is not limited to implementations that solve any or all disadvantages noted in any part of this disclosure.

BRIEF DESCRIPTION OF THE SEVERAL VIEWS OF THE DRAWING(S)

Preferred embodiments of the invention will now be described with reference to the following schematic drawings.

DETAILED DESCRIPTION OF THE INVENTION

It is to be understood that the aspects and embodiments of the invention described in this specification may be used in any combination with each other. Several of the aspects and embodiments may be combined together to form a further embodiment of the invention, and not all features, elements, or characteristics of an embodiment necessarily appear in other embodiments. A method, an appliance, or a computer readable medium which is an aspect of the invention may comprise any number of the embodiments or elements of the invention described in this specification.

Separate references to "an embodiment", "one embodiment", or "another embodiment" refer to particular embodiments or classes of embodiments (possibly different embodiments in each case), not necessarily all possible embodiments of the invention. Unless otherwise mentioned, "or" means either or both, or in a list, one or more of the listed items.

Figure 1:
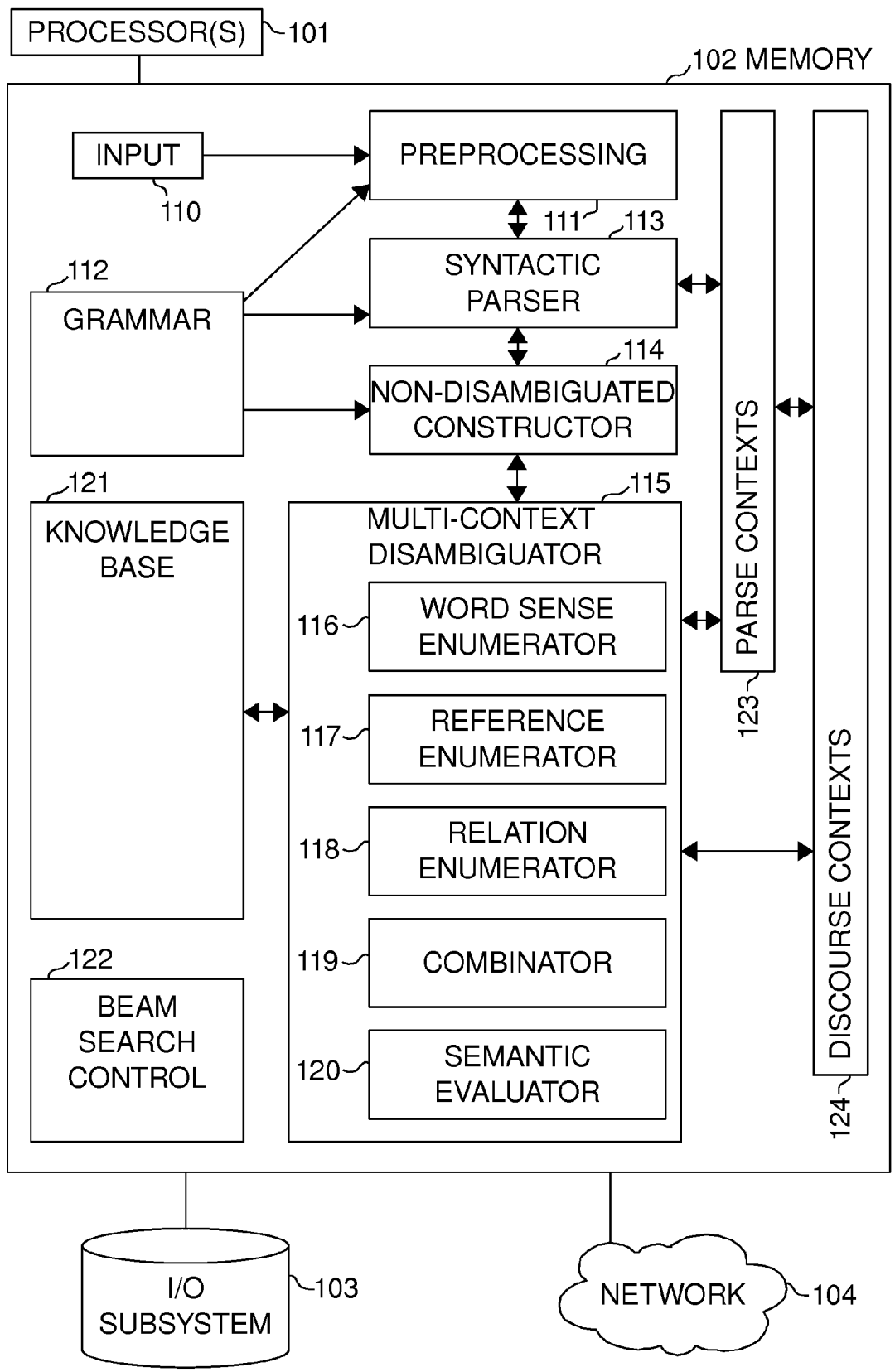
FIG. 1 illustrates a computer according to an embodiment of the invention.

FIG. 1 illustrates an apparatus (a computer) according to a possible embodiment of the invention. (101) illustrates one or more processors. The processors may be general purpose processors, or they may be, e.g., special purpose chips or ASICs. Several of the other components may be integrated into the processor. (102) illustrates the main memory of the computer. (103) illustrates an I/O subsystem, typically comprising mass storage (such as magnetic, optical, or semiconductor disks, tapes or other storage systems, RAID subsystems, etc.; it frequently also comprises a display, keyboard, speaker, microphone, camera, manipulators, and/or other I/O devices). (104) illustrates a network interface; the network may be, e.g., a local area network, wide area network (such as the Internet), digital wireless network, or a cluster interconnect or backplane joining processor boards and racks within a clustered or multi-blade computer. The I/O subsystem and network interface may share the same physical bus or interface to interact with the processor(s) and memory, or may have one or more independent physical interfaces. Additional memory may be located behind and accessible through such interfaces, such as memory stored in various kinds of networked storage (e.g., USB tokens, iSCSI, NAS, file servers, web servers) or on other nodes in a distributed non-shared-memory computer.

An apparatus according to various embodiments of the invention may also comprise, e.g., a power supply (which may be, e.g., switching power supply, battery, fuel cell, photovoltaic cell, generator, or any other known power supply), circuit boards, cabling, electromechanical parts, casings, support structures, feet, wheels, rollers, or mounting brackets.

(110) illustrates an input to be processed using a natural language processing system. The original input may be a string, a text document, a scanned document image, digitized voice, or some other form of natural language input to the parser. More than one natural language expression may be present in the input, and several inputs may be obtained and processed using the same discourse context.

The input passes through preprocessing (111), which may perform OCR (optical character recognition), speech recognition, tokenization, morphological analysis, morpheme graph or word graph construction, etc., as required by a particular embodiment. The grammar may configure the preprocessor (e.g., by morphological rules and morpheme inventory).

The grammar (112) is preferably a unification-based extended context-free grammar (see, e.g., T. Briscoe and J. Carroll: Generalized Probabilistic LR Parsing of Natural Language (Corpora) with Unification-Based Grammars, Computational Linguistics, 19(1):25-59, 1993), though other grammar formalisms can also be used. In some embodiments the original grammar may not be present on the computer, but instead data compiled from the grammar, such as a pushdown automaton and/or unification actions, may be used in its place. In some embodiments the grammar may be at least partially automatically learned.

(113) illustrates a parser capable of parsing according to the formalism used for the grammar. It may be an extended generalized LR parser (see, e.g., M. Tomita: Efficient Parsing for Natural Language: A Fast Algorithm for Practical Systems, Kluwer, 1986) with unification. The parser may produce parse trees (or a graph-structured parse forest), unification feature structures, or it may directly produce one or more non-disambiguated semantic representations, using either hand-coded rules or (semi-)automatically learned rules (similar to, e.g., Zettlemoyer et al (2009) or L. Tang and R. Mooney: Using Multiple Clause Constructors in Inductive Logic Programming, ECML 2001, Lecture Notes in Computer Science 2167, Springer, 2001, pp. 466-477).

(114) illustrates a non-disambiguated representation constructor. It constructs a non-disambiguated semantic representation of the input (e.g., phrase, clause, or sentence). The constructor is preferably integrated into the syntactic parser, for example, into parser actions triggered by the parser (such as certain reduce actions in a shift-reduce parser, or node construction in a CYK parser). In embodiments that construct a non-disambiguated representation incrementally, the non-disambiguated representation (or parts of it or references to it) may be stored in parse stack nodes in a GLR parser, or parsing table nodes in a CYK parser (and analogously for other kinds of parsers).

Disambiguation is performed by the multi-context disambiguator (115), which comprises various subcomponents, including enumerators (such as a word sense enumerator (116), a reference enumerator (117), a relation enumerator (118)), a combinator (119), and a semantic evaluator (120) for determining the weight of each combination. Some embodiments may have other enumerators or several instances of each broad type of enumerator (e.g., separate enumerators for references to discourse and for references to generally known entities). The various components of the multi-context disambiguator may be implemented together.

The knowledge base (121) provides background knowledge for the multi-context disambiguator (and particularly reference enumerator(s) and for evaluating combinations) and in some embodiments, also to the parser. It may comprise a lexicon, word meaning descriptions, selectional restriction information, thematic role information, grammar, statistical information (e.g., on co-occurrences), common sense knowledge (such as ontological and relational knowledge, information about the typical sequences of events in particular situations, capabilities of objects and agents, normal knowledge of people), etc.

Some disambiguation or reference resolution actions may perform logical inference over knowledge in the knowledge base. In some embodiments the knowledge base may reside partially in non-volatile storage (e.g., magnetic disk) or on other nodes in a distributed system. Data may be represented in the knowledge base using any combination of different knowledge representation mechanisms, including but not limited to semantic networks, logical formulas, frames, text, images, spectral and temporal patterns, etc.

The beam search control (122) controls the overall search process and manages the parse contexts (123). Beam search typically means best-first search, with the number of alternatives limited at each step (or, to within a threshold of the best alternative). Beam search is described in, e.g., B. Lowerre: The Harpy Speech Recognition System, Ph.D. thesis, Carnegie Mellon University, 1976 (NTIS ADA035146).

The parse contexts (123) represent alternative syntactic parses. Typically there will be a number of parse contexts at each step of parsing. Alternative parses represent syntactic ambiguity (or, in some embodiments, also semantic ambiguity). Parse contexts may comprise, besides parser-related data such as a parse stack or parse forest, semantic information such as the non-disambiguated semantic representation and/or actual semantic representations (or fragments thereof). Parse contexts may be merged in some embodiments (e.g., when implementing graph-structured stacks, in which case semantic content may sometimes be joined with an "OR" (disjunction) operator). In chart parsers, parse contexts may correspond to nodes in the chart or table (each table slot possibly containing a list of alternative parses or nodes).

The discourse contexts (124) comprise information about the current discourse and previously parsed sentences (though some embodiments may keep several sentences in the parse context). The discourse context and parse context may both influence the disambiguation. For example, individuals, concepts, and topic areas that have already been discussed in the same conversation or document are much more likely referents for later expressions in the same document.

Figure 2:
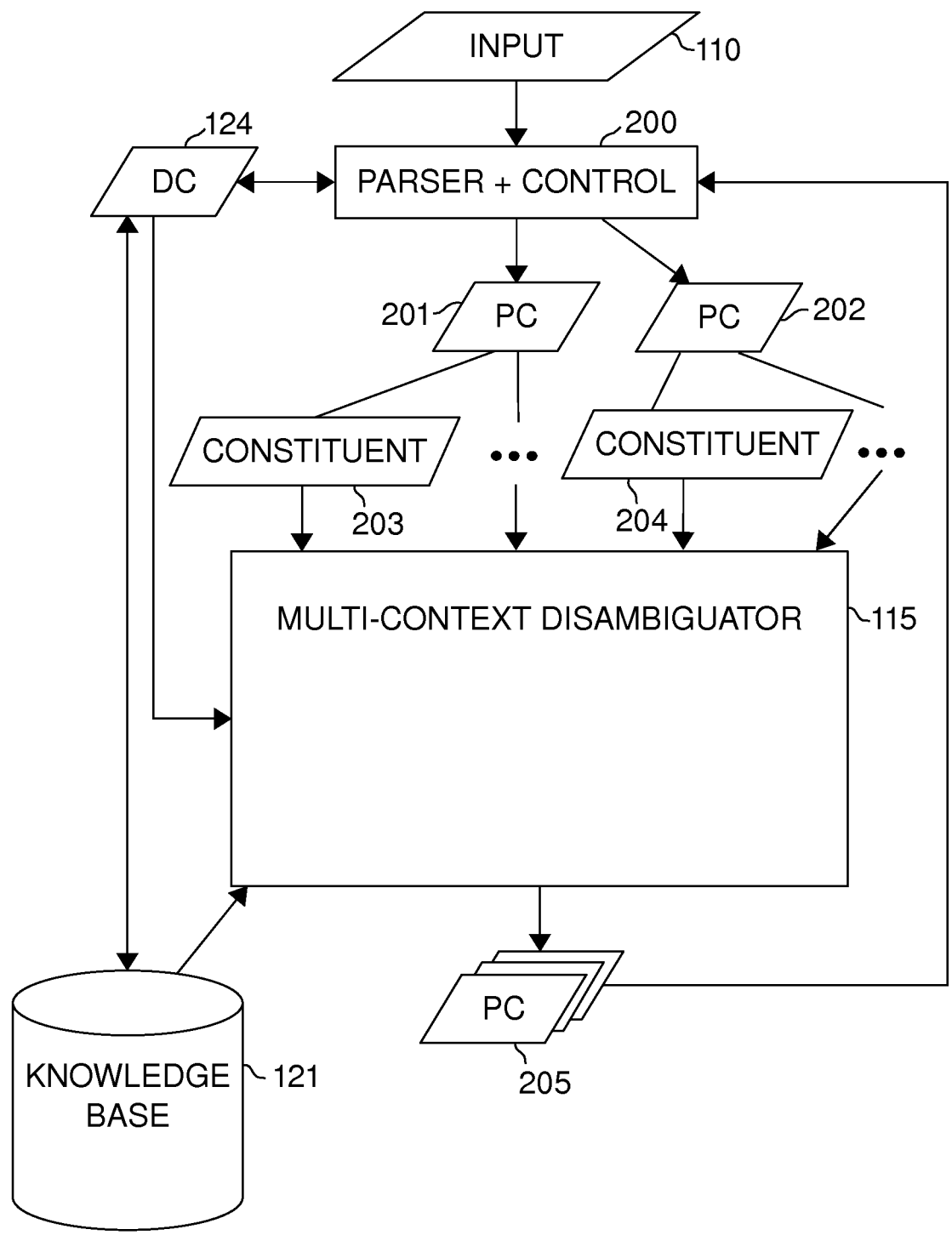
FIG. 2 illustrates how multi-context disambiguation can be embodied in a natural language interpretation system.

FIG. 2 illustrates an embodiment where multi-context disambiguation is integrated into a natural language processing system. The embodiment is shown in the context of one discourse context (124); an actual embodiment would typically have a plurality of discourse contexts, each with its associated parse contexts. In many embodiments different discourse contexts could be used in parallel, using multiple threads and/or multiple processors. (110) illustrates the input, (200) the syntactic parser and control logic for controlling parsing and triggering multi-context disambiguation at certain points during parsing (roughly, (113)+(114)), (201) and (202) illustrate parse contexts participating in multi-context disambiguation. The constituents (203) and (204) illustrate constituents from the input as interpreted in the parse contexts (201) and (202). In many embodiments a parse context may have more than one ambiguous constituent participating in multi-context disambiguation. It is not necessary for all constituents participating in the multi-context disambiguation to be ambiguous. There could be any number of them.

The multi-context disambiguator (115) produces a number (zero or more) of new parse contexts (205). Conceptually these parse contexts replace the original parse contexts (201, 202). In an implementation, it is possible that some of the new parse contexts reuse the data structures of the original parse contexts; however, they could also all be new data structures. If no parse contexts are produced, then it means that none of the participating parse contexts (201,202) were accepted. If more than one parse context is produced, then the disambiguation is not unique, but the weights indicate which is the best parse. Further parsing of the input may adjust the weights of the new parse contexts, and trigger further (joint) disambiguations, which may eventually raise one of the parse contexts with less than best weight to have the best weight (or even be the only remaining parse context).

Multi-context disambiguation may advantageously use the knowledge base (121), particularly for evaluating the different combinations and when evaluating what weight to assign to each choice and combination, as described in U.S. patent application Ser. No. 12/622,272.

The parse contexts participating in multi-context disambiguation should be compatible, according to some suitable definition. One possible rule (for generalized LR parsing) is to require that they are at the same position in the input, are in the same state, and have the same states on the stack. However, the semantic representation (or parse tree) they have constructed may be different.

Assuming the parser steps all parse contexts synchronously by an input token, this rule can be easily implemented using the following pseudo-code (this would be done for each input token). Essentially it groups the parse contexts for multi-context disambiguation based on their current state and the states in their stack.

initialize hash table whose key is list of integers and can hold list of parse contexts for each key;
    for each parse context pc:
        step the context by the input token;
        if disambiguation was requested while executing the step, add pc to the hash table using its current state and states in stack as key;
    for all keys in the hash table:
        get list of parse contexts for the key;
        perform multi-context disambiguation on all parse contexts in the list;

Another alternative is to perform multi-context disambiguation whenever stacks are combined in Tomita's parsing algorithm (or, when local ambiguity packing is performed). In such an embodiment, parse contexts could correspond to Tomita's stacks. See M. Tomita: Efficient Parsing for Natural Language: A Fast Algorithm for Practical Systems, Kluwer, 1986.

In chart parsers, multi-context disambiguation could be performed when combining lower-level nodes into a higher-level node. In such an embodiment parse contexts could correspond to nodes in the parse table.

Figure 3:
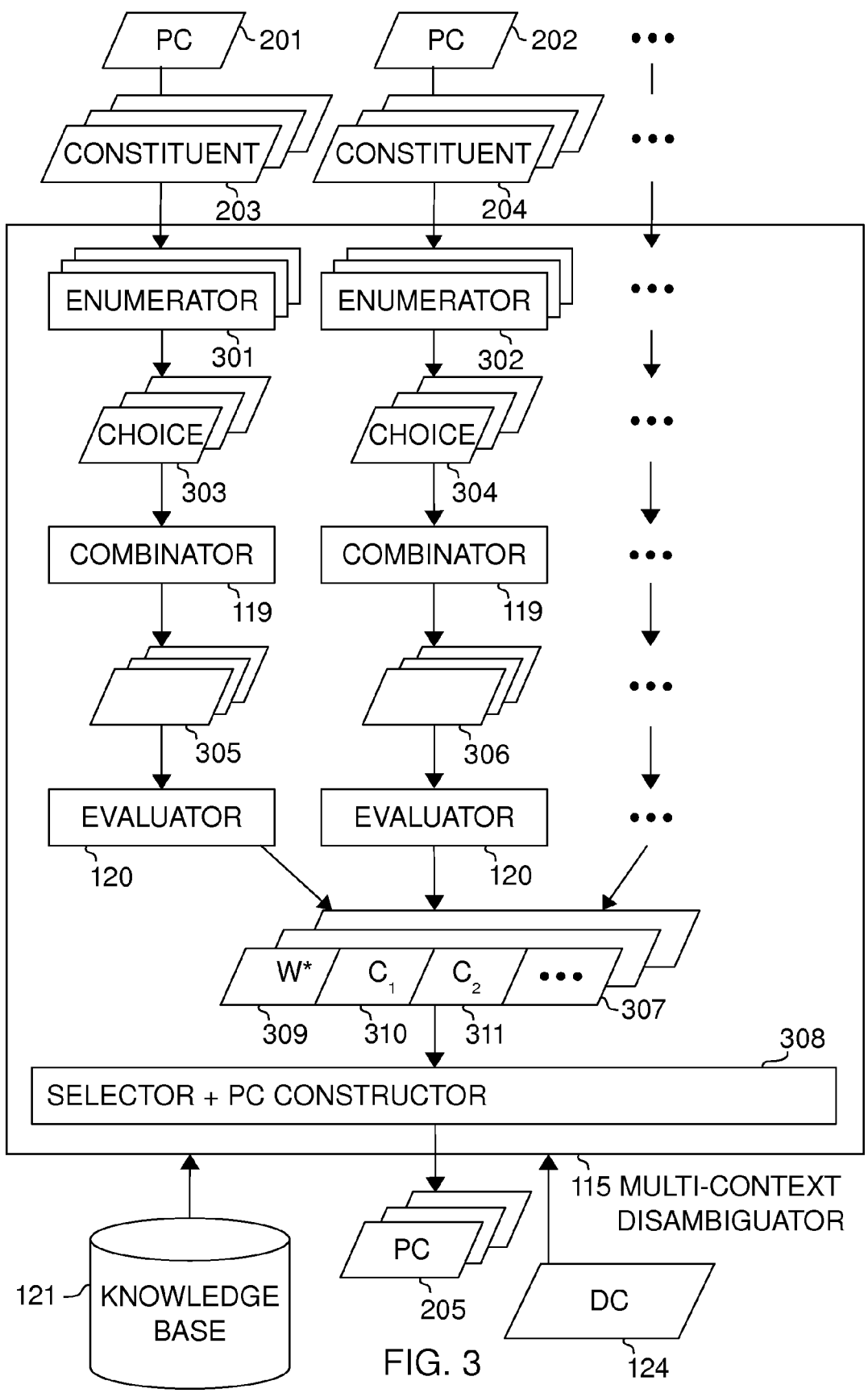
FIG. 3 illustrates data flow within an embodiment of a multi-context disambiguator.

FIG. 3 illustrates data flow within an embodiment of a multi-context disambiguator (115). For each of the participating parse contexts (201,202), a number of ambiguous aspects (e.g., constituents) are extracted. Different number of ambiguous aspects may be extracted from each parse context. In the figure, (203) illustrates ambiguities (typically constituents) extracted from the parse context (201), and (204) illustrates those extracted from (202). There could be more than two participating parse contexts.

(301) illustrates one or more enumerators for enumerating choices (303) for each of the constituents (203). Similarly, (302) illustrates enumerator(s) for enumerating choices (304) for the constituents (204).

(119) illustrates a combinator for combining choices, usually one choice for each ambiguous aspect from the corresponding parse context. Combinations are advantageously produced separately for each participating parse context.

Each generated combination (305,306) advantageously comprises a choice for each of the ambiguous aspects in the parse context from whose constituent it was created. Its form is advantageously the same as (307), comprising a weight (309), and one or more choices (310,311). For the generated combinations (305,306) the weight is an a priori weight computed from the individual choices; for the evaluated combinations (307), it is an a posteriori weight indicating the system's best estimate of how good the combination is as an interpretation of meaning in the current context. In some embodiments the generated combinations might not yet have weights, and in other embodiments weight computation is divided to many places in program code or many logical modules.

The combinations are then evaluated by the semantic evaluators (120). The same semantic evaluator can be used for combinations from all participating parse contexts, or separate evaluators can be used. When separate evaluators are used, the pipeline from the participating parse context to the evaluated combinations can be advantageously implemented such that the combinations for the different parse contexts are generated in parallel. The evaluators preferably utilize all available information about the current situation, and use inference mechanisms to analyze the sentence.

The evaluated combinations (307) are then passed to the selector+pc constructor (308), which selects one or more combinations with the best weight. In many embodiments, new parse contexts (205) are created for the selected combinations.

It is possible that more than one parse context has an identical constituent, particularly when graph-structured stacks are used. In some embodiments such identical constituents are identified when preparing to apply the multi-context disambiguator, and such constituents could be enumerated only once, and the resulting choices passed to the combinator for each parse context having the shared constituent.

The reader is referred to U.S. patent application Ser. No. 12/622,272 by the same inventor for a detailed description of how to implement enumerators (116,117,118,301,302), combinators (119), semantic evaluators (120), and the selector+pc constructor (308). As described therein, some combinations may also be filtered already during the enumeration, combination, or evaluation stages, for example if it is known that their weight cannot become within a threshold of the currently best combination, or if it cannot become better than the worst selected combination when the maximum number of combinations has already been tentatively selected.

Figure 4A:
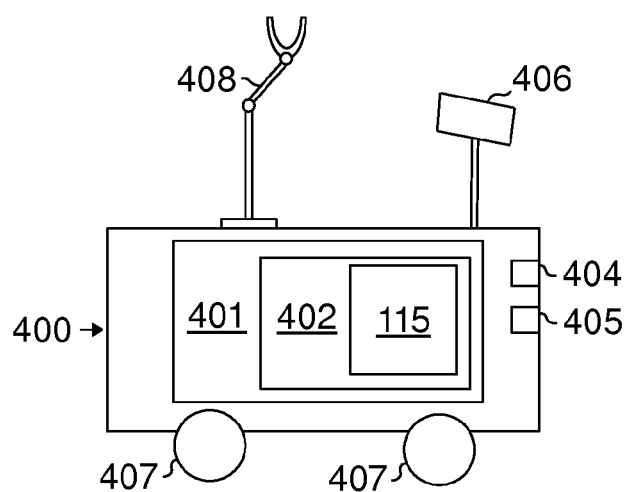
FIG. 4A illustrates a robot embodiment of the invention.

FIG. 4A illustrates a robot according to an embodiment of the invention. The robot (400) comprises a computer (401) for controlling the operation of the robot. The computer comprises a natural language interface module (402), which comprises a multi-context disambiguator (115). The natural language module is coupled to a microphone (404) and to a speaker (405) for communicating with a user. The robot also comprises a camera (406) coupled to the computer, and the computer is configured to analyze images from the camera at real time. The image processing module in the computer is configured to recognize certain gestures, such as a user pointing at an object (see, e.g., RATFG-RTS'01 (IEEE ICCV Workshop on Recognition, Analysis, and Tracking of Faces and Gestures in Real-Time Systems), IEEE, 2001 for information on how to analyze such gestures). Such gestures provide extralingual information that may be used in disambiguating the referent of certain natural language expressions (e.g., "take that bottle"). The robot also comprises a movement means, such as wheels (407) with associated motors and drives or legs, and one or more manipulators (408) for picking up and moving objects. The voice control interface makes the robot much easier for people to interact with, and multi-context disambiguation according to the present invention enables the voice control interface to understand a broader range of natural language expressions, providing improved user experience.

Figure 4B:
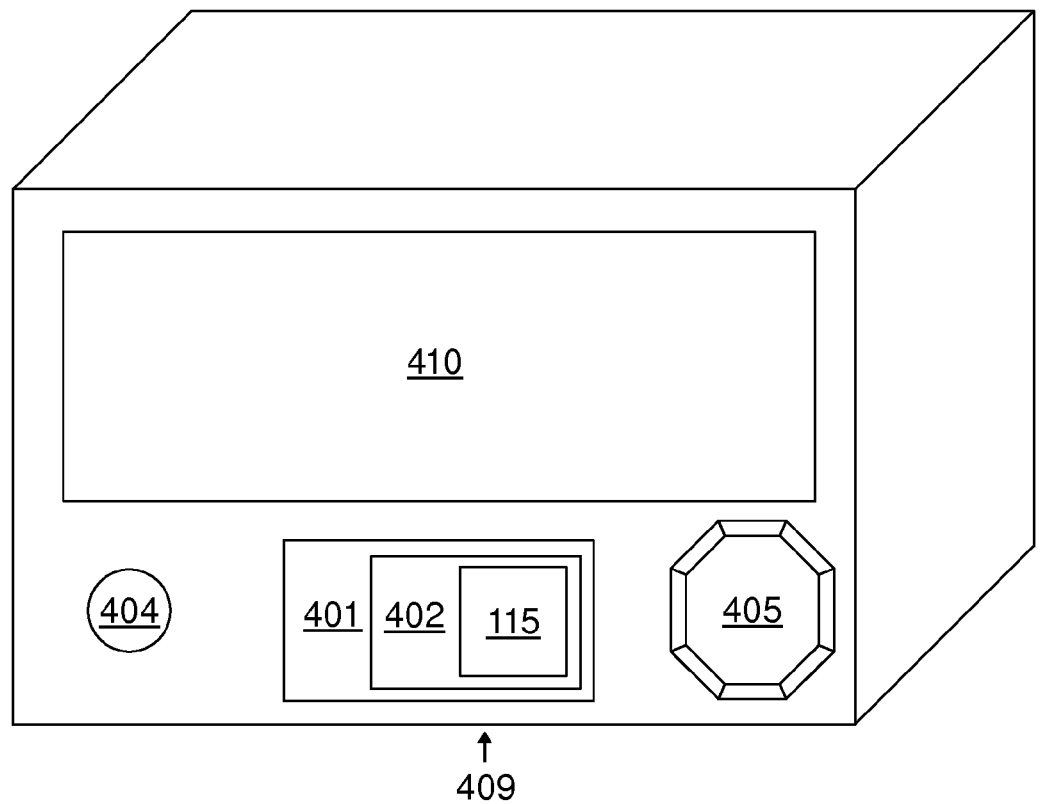
FIG. 4B illustrates an appliance embodiment of the invention.

FIG. 4B illustrates a home or office appliance according to an embodiment of the invention. The appliance (409) comprises a computer (401) with a natural language interface (402) and a multi-context disambiguator (115), as described herein. It also comprises a microphone (404) and speaker (405), and a display device (410) such as an LCD for displaying information to the user. As a home appliance, the appliance may be, e.g., a home entertainment system (typically also comprising a TV receiver and/or recorder, video player (e.g., DVD or Blu-Ray player), music player (e.g., CD or MP3 player), and an amplifier), or a game console (typically also comprising a high-performance graphics engine, virtual reality gear, controllers, camera, etc.), as they are known in the art. As an office appliance, it may, for example, provide information retrieval services, speech-to-text services, video conferencing or video telephony services, automated question answering services, access to accounting and other business control information, etc., comprising the additional components typically required for such functions, as are they known in the art. An improved natural language understanding capability due to the present invention could enable less skilled users to utilize such appliances. This could be commercially important especially in countries where many people are not comfortable with or trained for working with computers and/or typing.

The appliance may also be a mobile appliance (including also portable, handheld, and wearable appliances). Such appliances differ from home and office appliances primarily in miniaturization and in other components known in the art. In such an appliance, significant parts of the voice control interface, including the multi-context disambiguator, would preferably be implemented in digital logic to reduce power consumption, but could also be implemented in software. The present implementation may, for example, enable the construction of better portable translators than prior solutions.

An apparatus according to the invention could also be an ASIC, processor, or microchip for performing multi-context disambiguation, or a larger chip, processor, or co-processor for assisting in natural language processing functions generally.

Each kind of apparatus would also comprise other components typically included in such appliances, as taught in US patents.

Many variations of the above described embodiments will be available to one skilled in the art. In particular, some operations could be reordered, combined, or interleaved, or executed in parallel, and many of the data structures could be implemented differently. When one element, step, or object is specified, in many cases several elements, steps, or objects could equivalently occur. Steps in flowcharts or pseudo-code could be implemented, e.g., as state machine states, logic circuits, or optics in hardware components, as instructions, subprograms, or processes executed by a processor, or a combination of these and other techniques.

The various components according to the various embodiments of the invention, including, e.g., the syntactic parser, non-disambiguated representation constructor, joint meaning disambiguator, word sense enumerator, reference enumerator, relation enumerator, combinator, and semantic evaluator, are preferably implemented using computer-executable program code means that are executed by one or more of the processors. However, any one of them might be implemented in silicon or other integrated circuit technology (whether electrical, optical, or something else). Hardware implementation may be particularly desirable in handheld devices where power consumption is very important. It is generally known in the art how to compile state machines (including recursive state machines) into silicon, and programs can easily be converted into such state machines.

What is claimed is:

1. A method of resolving both semantic and syntactic ambiguity, comprising:
   generating, by a computer, combinations of semantic interpretation choices for each of at least two alternative syntactic parses of a natural language expression or part thereof; and
   selecting, by the computer, one or more best combinations from those generated for all of the alternative syntactic parses.

2. The method of claim 1, wherein the computer comprises a multi-context disambiguator.

3. The method of claim 2, further comprising:
enumerating more than one choice for at least one semantically ambiguous aspect of at least one of the alternative syntactic parses.

4. The method of claim 2, wherein at least one constituent that occurs in more than one alternative syntactic parse is enumerated only once, and the resulting choices are combined into combinations for more than one of the alternative syntactic parses.

5. The method of claim 1, wherein the alternative syntactic parses participating in the disambiguation are selected by grouping alternative syntactic parses based on their current state and states in their stack.

6. The method of claim 1, wherein the disambiguation is performed in connection with combining stacks.

7. The method of claim 1, wherein the disambiguation is performed in connection with local ambiguity packing.

8. The method of claim 1, wherein the disambiguation is performed in connection with combining nodes in a chart parser.

9. The method of claim 1, wherein each combination comprises exactly one choice for each ambiguous aspect in the corresponding alternative syntactic parse.

10. The method of claim 1, wherein combinations generated for two alternative syntactic parses comprise a different number of choices.

11. The method of claim 1, wherein combinations are collected from several combinators (119) for selection by a single selector (308).

12. An apparatus comprising:
a processor;
a memory connected to the processor comprising:
computer program code for causing the processor to generate combinations of semantic interpretation choices for each of at least two alternative syntactic parses of a natural language expression or part thereof; and
computer program code for selecting one or more best combinations from those generated for the alternative syntactic parses.

13. The apparatus of claim 12, wherein the apparatus is a computer.

14. The apparatus of claim 12, wherein the apparatus is a robot.

15. The apparatus of claim 12, wherein the apparatus is a home or office appliance.

16. A non-transitory computer readable medium comprising a computer program product, which when executed on a computer is operable to cause the computer to resolve both semantic and syntactic ambiguity in a parsed natural language expression, the medium comprising:
a computer readable program code means for causing a computer to generate combinations of semantic interpretation choices for each of at least two alternative syntactic parses of a natural language expression or part thereof; and
a computer readable program code means for causing a computer to select one or more best combinations from those generated for all of the alternative syntactic parses.

* * * * *